United States Patent [19]
Elphingstone et al.

[11] 3,893,510
[45] July 8, 1975

[54] EMULSION METHOD OF INTRODUCING POLYMERS INTO A SUBTERRANEAN FORMATION

[75] Inventors: Eugene A. Elphingstone; Homer C. McLaughlin; Charles W. Smith, all of Duncan, Okla.

[73] Assignee: Halliburton Company, Duncan, Okla.

[22] Filed: Aug. 12, 1974

[21] Appl. No.: 496,614

[52] U.S. Cl. ................. 166/295; 166/294; 166/275
[51] Int. Cl.² .................. E21B 33/138; E21B 43/22
[58] Field of Search ........... 166/295, 294, 293, 300, 166/281, 273, 274, 275

[56] References Cited
UNITED STATES PATENTS 3,145,774  8/1964  Patchen ............................. 166/293
3,721,295  3/1973  Bott ................................... 166/295
3,724,547  4/1973  Bott ................................... 166/275
3,760,880  9/1973  Dollarhide ......................... 166/295

Primary Examiner—Stephen J. Novosad
Assistant Examiner—George A. Suckfield
Attorney, Agent, or Firm—John H. Tregoning; Fred E. Hook; Thomas R. Weaver

[57] ABSTRACT

Suitable water soluble polymers for reducing the permeability of a subterranean formation to the flow of aqueous liquids therethrough are introduced into the subterranean formation as a dispersion of these water soluble polymers in particulated form in a water-in-oil emulsion. The emulsion is diluted with a mixture of aqueous liquid and liquid hydrocarbon before injecting the emulsion into the formation.

10 Claims, No Drawings

EMULSION METHOD OF INTRODUCING POLYMERS INTO A SUBTERRANEAN FORMATION

Water is often associated with the production of liquid petroleum from subterranean formations. During primary production, e.g., when the petroleum containing zone is under sufficient pressure to force the liquid petroleum toward a production well penetrating the subterranean formation, water from a zone adjacent to the petroleum containing zone often enters the production well by passing through the petroleum containing zone and interferes with the production of the liquid petroleum. During secondary production, e.g., when the energy of the petroleum containing reservoir has been depleted and another energy source, generally water under pressure, is injected into the reservoir to force the liquid petroleum toward a production well penetrating the subterranean formation, the injected water used for forcing the liquid through the subterranean formation preferentially moves through the most permeable portion of the subterranean formation and interferes with the production of liquid petroleum.

Many petroleum containing zones have areas of low permeability and areas of high permeability such that water injected during secondary production will move through the high permeability areas at a faster rate than through the low permeability areas within the formation. By moving through the high permeability areas at a more rapid rate than through the low permeability areas, the portion of injected water which flows through the more permeable areas in the petroleum containing zone will enter the production well along with the liquid petroleum, thus reducing the efficiency of the secondary production.

It has been discovered that high molecular weight polymers such as the water soluble polyacrylamide polymers can be introduced into a subterranean formation from which liquid petroleum is being produced to reduce the permeability of the formation to the flow of water through the formation. It has also been found that these polymers do not decrease the permeability of the formation to the flow of liquid petroleum therethrough. When an aqueous fluid containing these high molecular weight polymers is injected into a subterranean formation during secondary production, a larger proportion of the polymer will enter the high permeability area of the formation than will enter the low permeability area of the formation. This tends to equalize the permeability of the formation to the flow of aqueous fluids therethrough and increase the efficiency of secondary production. When these high molecular weight polymers are introduced into a producing formation through which water has encroached during primary production, the permeability of the formation to the flow of water therethrough is reduced, thus reducing the amount of water produced along with the liquid hydrocarbon.

These high molecular weight polymers can be introduced into subterranean formations as solutions of the high molecular weight polymers in an aqueous fluid or as monomer containing aqueous fluid and polymerized within the subterranean formation. It has also been disclosed that an emulsion, containing dispersed therein about 0.01 to 35 percent by weight of a finely-divided water soluble vinyl addition polymer, can be diluted in a liquid hydrocarbon and introduced into a subterranean formation. The emulsion breaks upon contact with the aqueous fluid in the formation, thus the polymer hydrates within the formation.

These methods of introducing high molecular weight polymers into a subterranean formation are not completely satisfactory. An aqueous fluid having high molecular weight polymers dissolved therein can be injected into the subterranean formation only at low injection rates. It is difficult to control the polymerization of monomers within the subterranean formation to produce a high molecular weight polymer and it has been found that the liquid hydrocarbons which are disclosed as diluents for emulsions, containing about 0.01 to 35 percent by weight finely-divided vinyl addition polymers, are efficient for carrying only a low concentration of the emulsion into a subterranean formation. At high concentrations, the emulsion filters out on the face of the subterranean formation and restricts the flow of additional fluid into the subterranean formation.

It has now been found that a water-in-oil emulsion having dispersed therein about 0.01 to 35 parts by weight particulated water soluble polymers per 100 parts by weight emulsion can be diluted in a carrier liquid which comprises about 10 to 70 parts by weight aqueous liquid and about 30 to 90 parts by weight liquid hydrocarbon per 100 parts by weight of the carrier liquid and injected into a subterranean formation. In the subterranean formation the emulsion can be broken and the polymers hydrated by the water contained in the formation to reduce the permeability of the formation to the flow of aqueous liquids therethrough.

The water-in-oil emulsion may be prepared by any number of techniques. For example, the emulsions may be prepared by using high speed agitation or ultrasonic techniques. As a general rule the amount of oil-to-water may vary between about 10 to 500 parts and preferably about 10 to 50 parts by weight oil per 100 parts by weight water. To produce an emulsion which is stable for an extended period of time, it is desirable to use an emulsifying agent when forming the emulsion. Many oil soluble emulsifying agents are available and are generally considered to be surfactants having low HLB numbers. A listing of surfactants with low HLB numbers is included in such references as the *Atlas HLB Surfactant Selector*. An example of a suitable emulsifier having a low HLB number is sorbitan monooleate.

The concentration of surfactant necessary for forming a stable emulsion can be determined by routine experimentation; however, it has been found that a concentration of the emulsifier within the range of about 0.1 to 30 parts emulsifier per 100 parts by weight oil is generally required.

The organic liquids which are suitable for use as the oil phase in the water-in-oil emulsion are organic liquids which have low viscosities and are immiscible with water. Examples of such organic liquids include but are not limited to liquid aliphatic hydrocarbons having greater than about five carbon atoms, liquid aromatic hydrocarbons and mixtures of these aliphatic and aromatic hydrocarbons.

Examples of suitable aliphatic hydrocarbons include n-heptane, n-dodecane, n-pentadecane, isohexane, 3-methylpentane, 2,3-dimethylbutane, cyclohexane, cyclooctane, methylcyclopentane, 1,2-dimethylcyclopentane and methylcyclohexane.

Examples of suitable liquid aromatic hydrocarbons include benzene, xylene, toluene, tetrahydronaphthalene and 1-methylnaphthalene. Aromatic hydrocarbons such as styrene are not suitable.

Examples of suitable mixtures of these hydrocarbons include diesel oil, kerosene and naptha.

After forming the emulsion, the particulated water soluble polymers are dispersed in the emulsion by using any suitable device such as stirrers or homogenizers. The particle sizes of the particulated water soluble polymer is important and should be less than about 5 microns and preferably within the range of about 5 millimicrons to 5 microns. These particle sizes are necessary for injection into subterranean formations and for maintaining the particles in suspension in the emulsion.

One method of producing particles having these particle sizes is by drying an aqueous solution of these polymers in a spray dryer having appropriate nozzles. In another method, synthetic polymers such as polyacrylamide and other polymers formed by polymerizing ethylenic unsaturated monomers can be polymerized in the emulsion to form particulated water soluble polymers having suitable particle sizes. By this method, the monomers and a free radical type polymerization type catalyst are added to the water-in-oil emulsion under conditions such that the monomers polymerize therein.

Suitable water soluble polymers for dispersion in the water-in-oil emulsion include polysaccharide, polysaccharide derivatives, cellulose derivatives, synthetic polymers and mixtures thereof. Examples of suitable water soluble polysaccharides include guar gum and locust bean gum. Examples of suitable polysaccharide derivatives include hydroxyethyl guar gum and carboxymethyl guar gum. Suitable water soluble cellulose derivatives include hydroxyethylcellulose, carboxymethylcellulose, carboxymethylhydroxyethylcellulose, and sulfopropylcellulose. Suitable synthetic polymers include polyacrylamide, copolymers of acrylamide and sodium acrylate, and copolymers of acrylamide and sodium 2-acrylamido-2-methyl propane sulfonate.

Prior to injecting the water-in-oil emulsion having the particulated water soluble polymers dispersed therein into a subterranean formation, the emulsion is homogeneously mixed with a liquid hydrocarbon and with an aqueous liquid to reduce the viscosity of the emulsion such that the mixture can be introduced into the subterranean formation. Preferably the emulsion is first homogeneously mixed with a liquid hydrocarbon and that mixture is homogeneously mixed with an aqueous liquid to reduce the viscosity of the emulsion. By mixing the emulsion with the liquid hydrocarbon prior to adding the aqueous liquid, the high viscosity produced by first mixing the emulsion with the aqueous liquid is eliminated. The viscosity required for injection of this mixture into a subterranean formation depends on the permeability of the formation. However, it is generally desirable to dilute the emulsion to an apparent viscosity of about 5 to 50 centipoise and preferably about 5 to 15 centipoise.

Suitable liquid hydrocarbons for diluting the emulsion include low viscosity, water immiscible, liquid aliphatic hydrocarbons, liquid aromatic hydrocarbons and mixtures thereof. Some crude oil is also suitable for diluting the emulsion. However, crude oil often contains components which could cause an inversion of the emulsion and should be checked with the emulsion to determine their effect on the stability of the emulsion.

Examples of suitable liquid aliphatic hydrocarbons are n-heptane, n-decane, n-pentadecane, isohexane, 2,3-dimethylbutane, 1-hexene, cycloheptane, cyclohexane, methylcyclopentane, 1,2-dimethylcyclopentane, cyclohexene and 1,4-cyclohexadiene.

Examples of suitable liquid aromatic hydrocarbons include benzene, toluene, xylene, isodurene, n-propylbenzene, decahydronapthalene and 1-methylnapthalene. Styrene is not a suitable aromatic hydrocarbon.

Examples of suitable mixtures of liquid hydrocarbons include naptha, kerosene and diesel oil.

Any potable water is suitable for use as the aqueous liquid. If other aqueous liquids are to be used, they should be checked with the emulsion to determine their effect on the stability of the emulsion. Some of the common constituents of aqueous liquids which could affect the emulsion are surfactants and salts. Some surfactants are referred to as de-emulsifying surfactants and can cause premature inversion of the emulsion. Other surfactants are referred to as emulsifying surfactants and could increase the stability of the emulsion such that the emulsion would not invert at the appropriate time after placement of the emulsion in the formation. Many salts such as calcium chloride, magnesium chloride, sodium chloride and potassium chloride can be included in the aqueous liquid at low concentrations without affecting the emulsion. However, at high concentrations these salts could cause premature inversion of the emulsion.

The ratio of liquid hydrocarbon and aqueous liquid in the carrier liquid is important and is selected in view of viscosity and the inversion rate of the emulsion. The carrier liquid is useful within the range of about 10 to 70, preferably about 15 to 50, and most preferably about 25 to 40 parts by weight aqueous liquid and about 30 to 90, preferably about 50 to 85, and most preferably about 60 to 75 parts by weight liquid hydrocarbon per 100 parts by weight carrier liquid. At the low ratios of aqueous liquid to liquid hydrocarbon, the carrier has a low viscosity such that the emulsion will remain suspended in the carrier liquid and will not settle out of the carrier liquid as long as the carrier liquid is in motion. As the ratio of aqueous liquid to liquid hydrocarbon is increased, the viscosity of the carrier liquid will increase. At the higher ratios of aqueous liquid to liquid hydrocarbon the carrier liquid has a high viscosity and can be injected into a subterranean formation at only a low injection rate without increasing the injection pressure to the fracturing pressure of the formation. At the higher ratios of water to liquid hydrocarbon, it is also noted that the viscosity of the emulsion-carrier liquid mixture increases as the mixture is sheared. This indicates that the emulsion is inverting such that the polymer particles can be hydrated by the aqueous liquid in the carrier liquid.

The water-in-oil emulsion having the particulated water soluble polymers dispersed therein is carried into the subterranean formation where the emulsion will break, thus releasing the polymers to form a viscous aqueous solution within the formation. It has been found that the surface tensions of the fluids flowing through the formations will cause the emulsion to break. It has also been found that the high temperatures of some subterranean formations will accelerate the rate at which the emulsion breaks. The emulsion can also be broken at an accelerated rate by contacting the emulsion with an aqueous solution containing a water soluble surfactant. This can be accomplished by flowing the aqueous surfactant solution through the formation prior to injecting the emulsion into the formation or by displacing the emulsion into the formation with the surfactant solution. Examples of suitable surfactants include ethoxylated nonyl phenols, octyl phenol polyethoxyethanol, potassium myristate, potassium stearylsulfate, sodium lauryl sulfonate, polyoxyethylene alkyl phenol, polyoxyethylene, polyoxyethylene (20 mole) stearyl ether, and N-cetyl N-ethyl morpholinium ethosulfate.

The following examples are presented to illustrate specific aspects of the use of a mixture of an emulsion containing particulated water soluble polymers and a carrier liquid which comprises an aqueous liquid and a liquid hydrocarbon.

EXAMPLE I

A mixture of commercially available emulsion having a water soluble polymer suspended therein is mixed with kerosene and fresh water and the properties of the mixture are evaluated. The apparent viscosity of the mixture is determined with a Brookfield viscometer and the percent of settlings is measured after the mixture has remained quiescent for one hour. These tests are represented by Table 1 which lists the volume of kerosene mixed with the emulsion, the apparent viscosity of the mixture and the percent settling of the mixture. The mixture is formulated by first mixing the volume of kerosene indicated on Table 1 with each 10 milliliters of emulsion and thereafter mixing 10 milliliters of fresh water for each 10 milliliters of emulsion with the mixture of emulsion and kerosene. This series of tests indicate that the apparent viscosity of an emulsion mixed with kerosene and fresh water decreases with increasing concentrations of kerosene and that the percent settling increases with increasing concentrations of kerosene.

The commercially available emulsion used in these tests is described in promotional material as having a specific gravity of 1.025, a light amber color and a viscosity of 400 centipoises at 80°F as measured with a Brookfield viscometer using a No. 2 spindle at 30 RPM. It is thought that the polymer included in the emulsion is polyacrylamide which is about 7 percent hydrolyzed and has a molecular weight of about two to four million. It is also thought that polyacrylamide is produced by copolymerizing acrylamide and sodium acrylate monomers in the emulsion. The emulsion is thought to consist of about 30 parts by weight polymer, about 30 parts by weight water, about 35 parts by weight liquid hydrocarbon and about 5 parts by weight emulsifying surfactant per 100 parts by weight emulsion. The liquid hydrocarbon is thought to be a branch chain isoparaffinic solvent having an API specific gravity at 60°F of about 50 and a Pensky-Martens closed cup flash point of about 160°F.

Table 1

Properties of Emulsion Mixed With Kerosene and Fresh Water

| Kerosene (ml) | Apparent Viscosity (cps) | Settling at 1 Hour (Percent) |
| --- | --- | --- |
| 10 | 115 | 1.6 |

Table 1-Continued

Properties of Emulsion Mixed With Kerosene and Fresh Water

| Kerosene (ml) | Apparent Viscosity (cps) | Settling at 1 Hour (Percent) |
| --- | --- | --- |
| 20 | 21.5 | 7.5 |
| 30 | 24 | 19.0 |
| 40 | 10 | — |
| 50 | 5 | 53.7 |

EXAMPLE II

The test results reported on Table 2 represent tests which are conducted by the procedure described in Example I with the volumes of kerosene represented on Table 2 being mixed with 20 milliliters of water for each 10 milliliters of emulsion. The test results represented by Table 2 indicate that additional water increases the apparent viscosity and reduces the percent settling of the emulsion from the mixture of emulsion with kerosene and fresh water. The tests represented on Table 2 also indicate that increasing the concentration of kerosene reduces the apparent viscosity of the mixture.

Table 2

Properties of Emulsion Mixed With Kerosene and Fresh Water

| Kerosene (ml) | Apparent Viscosity (cps) | Settling at 1 Hour (Percent) |
| --- | --- | --- |
| 10 | 230 | 0 |
| 20 | 60 | 3.4 |
| 30 | 19 | 6.1 |
| 40 | 15 | 25.7 |
| 50 | 14 | 24.0 |

EXAMPLE III

The tests represented on Table 3 were conducted by the procedures described in Example I using a mixture of 20 milliliters of fresh water and 30 milliliters of the liquid hydrocarbon indicated on Table 3 for each 10 milliliters of emulsion. These test results indicate that low viscosity aliphatic and aromatic hydrocarbons are suitable as components in the carrier liquid. It is also noted that mineral oil which has a higher viscosity than diesel oil, kerosene or naptha produced an emulsion-carrier liquid mixture with a higher apparent viscosity than desirable. These tests also indicated that these liquid hydrocarbons produced a homogeneous mixture which is suitable for injection into a subterranean formation. Other solvents were tested by this test procedure with the results not being reported on Table 3. The results are not reported because these solvents caused inversion of the emulsion. These solvents are methanol, isopropanol, n-Butanol, acetone, ethyl acetate, glacial acetic acid and styrene. Several crude oils were also tested and the results not reported on Table 3. These crude oils produced emulsion-carrier liquid mixtures with viscosities in the range of 250 to 600 centipoises, and would not be considered as satisfactory for injection into many subterranean formations. The crude oils tested were Waddell crude, Oil Creek crude, Spraberry crude and Arbuckle crude.

Table 3

Viscosity of Emulsion Mixed With Liquid Hydrocarbon and Fresh Water

| Liquid Hydrocarbon | Apparent Viscosity (cps) |
| --- | --- |
| No. 1 Diesel Oil | 28.5 |
| No. 2 Diesel Oil | 22.0 |
| Kerosene | 28.5 |
| Mineral Oil | 2150 |
| Naptha | 15.5 |
| Hexane | 17.5 |
| Iso-Octane | 30.5 |
| Pentane | 28.0 |
| Cyclohexane | 40.0 |
| Xylene Bottoms | 40.0 |
| Xylene | 29.0 |
| Toluene | 31.0 |

EXAMPLE IV

Table 4 represents tests conducted by the procedures described in Example I with the emulsion being mixed with 30 milliliters of kerosene and 20 milliliters of the sodium chloride brine indicated on Table 4 with each 10 milliliters of emulsion. The results reported on Table 4 indicate that sodium chloride brine can increase the percent settling of the emulsion mixture and that these concentrations of sodium chloride do not cause inversion of the emulsion.

Table 4

Settling of Emulsion Mixed with Kerosene and Sodium Chloride Brine

| Sodium Chloride (Percent) | Settling at 1 Hour (Percent) |
| --- | --- |
| 7.4 | 34.4 |
| 3.7 | 23.0 |
| 1.48 | 23.9 |
| 0.74 | 21.6 |

EXAMPLE V

The tests represented by Table 5 are similar to the tests represented by Table 4 except that the salts used to produce the brine used in the tests represented on Table 5 are sodium chloride, calcium chloride and magnesium chloride with 6 moles of water. The brine is produced by mixing 100 grams of fresh water with 7.5 grams of sodium chloride, 0.57 gram of calcium chloride, 0.43 gram of magnesium chloride with 6 moles of water.

Table 5

Settling of Emulsion Mixed with Kerosene and Brine

| Salt (Percent) | Settling at 1 Hour (Percent) |
| --- | --- |
| tc,16 41.9 | 7.64 |
| 37.0 | 3.82 |
| 30.0 | 1.53 |
| 19.0 | 0.764 |

EXAMPLE VI

Table 6 represents tests conducted with the emulsion described in Example I mixed with kerosene and fresh water and circulated through a pump having a plunger and two check valves to evaluate the effect of shear on the stability of the mixture. The apparent viscosity reported on Table 6 was measured after the mixtures were circulated through the pump for the indicated number of minutes. The mixtures represented on Table 6 were produced by first mixing 10 parts by volume of the emulsion with 30 parts by volume of kerosene and thereafter mixing the kerosene and emulsion with the parts by volume of fresh water indicated on Table 6. The test results as reported on Table 6 indicate that the higher volumes of water can cause increases in the viscosity of the mixture as the mixture is sheared. This increase in viscosity is thought to be caused by inversion of the emulsion and hydration of the polymers contained in the emulsion.

Table 6

Shear Properties of Emulsion Mixed with Kerosene and Indicated Parts by Volume of Fresh Water

| Shear Time (Min.) | Water 20 Parts | Water 40 Parts | Water 60 Parts | Water 100 Parts |
| --- | --- | --- | --- | --- |
|  | Apparent Viscosity (cps) | | | |
| 5 | 20 | 80 | 110 | 62.5 |
| 15 | 20 | 90 | 113 | 95 |
| 40 | 22.5 | 90 | 135 | 291 |
| 60 | 17.5 | 87 | 140 | 350 |

EXAMPLE VII

The tests reported on Table 7 were conducted with a mixture of kerosene and the emulsion described in Example I. The mixture is prepared by mixing the volume of kerosene indicated on Table 7 with each 10 milliliters of emulsion. The apparent viscosity of the mixture is measured with a Brookfield viscometer. The test results reported on Table 7 indicate that the apparent viscosity is reduced with increasing volumes of kerosene. These tests also indicated that the settling of the emulsion increases with increasing volumes of kerosene.

Table 7

Properties of Mixture of Emulsion and Kerosene

| Kerosene (ml) | Apparent Viscosity (cps) |
| --- | --- |
| 0 | 610 |
| 5 | 70 |
| 10 | 30 |
| 20 | 13 |
| 40 | 8 |
| 80 | 3 |
| 100 | 2 |

EXAMPLE VIII

The test results reported on Table 8 illustrate the properties of the emulsion described in Example I when the emulsion is mixed with increasing volumes of fresh water. These tests are conducted by mixing the volumes of fresh water indicated on Table 8 with each 10 milliliters of emulsion. These test results indicate that low volumes of water produce a mixture with very high viscosities and that the viscosity is reduced with increasing volumes of water. These tests also indicate that the mixture of high volumes of water with the emulsion causes the emulsion to invert and the polymers contained therein to hydrate.

Table 8

| Properties of Mixture of Emulsion and Water | |
|---|---|
| Fresh Water (ml) | Apparent Viscosity (cps) |
| 20 | 2,000,000 |
| 40 | 1,700,000 |
| 80 | 2,000 |
| 100 | 200 |

It is to be understood that the specification and examples are given for the purposes of illustrating and explaining the invention and that suitable variations may be made within the scope of the appended claims without departing from the invention.

What is claimed is:

1. A method of treating a subterranean formation to reduce the permeability of the formation to the flow of aqueous liquids therethrough, which comprises the steps of:
 introducing a polymer containing treating composition into the subterranean formation, and
 maintaining the treating composition in the subterranean formation until the polymers contained in the treating composition have been hydrated;
 said polymer containing treating composition comprising a water-in-oil emulsion which comprises about 10 to 500 parts by weight oil per 100 parts by weight water, said water-in-oil emulsion having about 0.01 to 35 parts by weight particulated water soluble polymers per 100 parts by weight emulsion dispersed therein; said treating composition further comprising a homogeneous mixture of said water-in-oil emulsion with a carrier liquid which comprises about 10 to 70 parts by weight aqueous liquid and about 30 to 90 parts by weight liquid hydrocarbon per 100 parts by weight of said carrier liquid.

2. The method of treating a subterranean formation as described in claim 1 wherein said carrier liquid comprises about 15 to 50 parts by weight aqueous liquid and about 50 to 85 parts by weight liquid hydrocarbon per 100 parts by weight of said carrier liquid.

3. The method of treating a subterranean formation as described in claim 2 wherein said treating composition comprises sufficient carrier liquid to reduce the apparent viscosity of said treating composition to within the range of about 5 to 50 cps.

4. The method of treating a subterranean formation as described in claim 1 wherein said treating composition comprises sufficient carrier liquid to reduce the apparent viscosity of the treating composition to within the range of about 5 to 15 cps.

5. The method of treating a subterranean formation as described in claim 4 wherein said carrier liquid comprises about 25 to 40 parts by weight aqueous liquid and about 60 to 75 parts by weight liquid hydrocarbon per 100 parts by weight of said carrier liquid.

6. The method of treating a subterranean formation as described in claim 5 wherein said particulated water soluble polymers have particle sizes of less than about 5 microns.

7. The method of treating a subterranean formation as described in claim 5 wherein said particulated water soluble polymers are water soluble, synthetic polymers having particle sizes within the range of about 5 millimicrons to 5 microns.

8. The method of treating a subterranean formation as described in claim 7 wherein said liquid hydrocarbon is selected from the group consisting of kerosene, diesel oil, naptha, or mixtures thereof.

9. The method of treating a subterranean formation as described in claim 1 wherein said treating composition is prepared by first homogeneously mixing said emulsion having said particulated polymers dispersed therein with said liquid hydrocarbon, and thereafter homogeneously mixing said mixture of emulsion and liquid hydrocarbon with said aqueous liquid.

10. The method of treating a subterranean formation as described in claim 9 wherein said treating composition comprises sufficient carrier liquid to reduce the apparent viscosity of the treating composition to within the range of about 5 to 15 cps; wherein said carrier liquid comprises about 25 to 40 parts by weight aqueous liquid and about 60 to 75 parts by weight liquid hydrocarbon per 100 parts by weight of said carrier liquid; wherein said particulated water soluble polymers have particle sizes within the range of about 5 millimicrons to 5 microns; and, further, wherein said liquid hydrocarbon is selected from the group consisting of kerosene, diesel oil, naptha, or mixtures thereof.

* * * * *

UNITED STATES PATENT AND TRADEMARK OFFICE
CERTIFICATE OF CORRECTION

PATENT NO. : 3,893,510

DATED : July 8, 1975

INVENTOR(S) : Eugene A. Elphingstone; Homer C. McLaughlin; Charles W. Smith

It is certified that error appears in the above-identified patent and that said Letters Patent are hereby corrected as shown below:

Column 7, Table 5, should read:

| Salt (Percent) | Settling at 1 Hour (Percent) |
|---|---|
| 7.64 | 41.0 |
| 3.82 | 37.0 |
| 1.53 | 30.0 |
| 0.764 | 19.0 |

Signed and Sealed this twenty-first Day of October 1975

[SEAL]

Attest:

RUTH C. MASON
Attesting Officer

C. MARSHALL DANN
Commissioner of Patents and Trademarks